April 25, 1933.  W. F. EAMES  1,905,275
MOTOR CONTROL SYSTEM
Filed Feb. 15, 1930
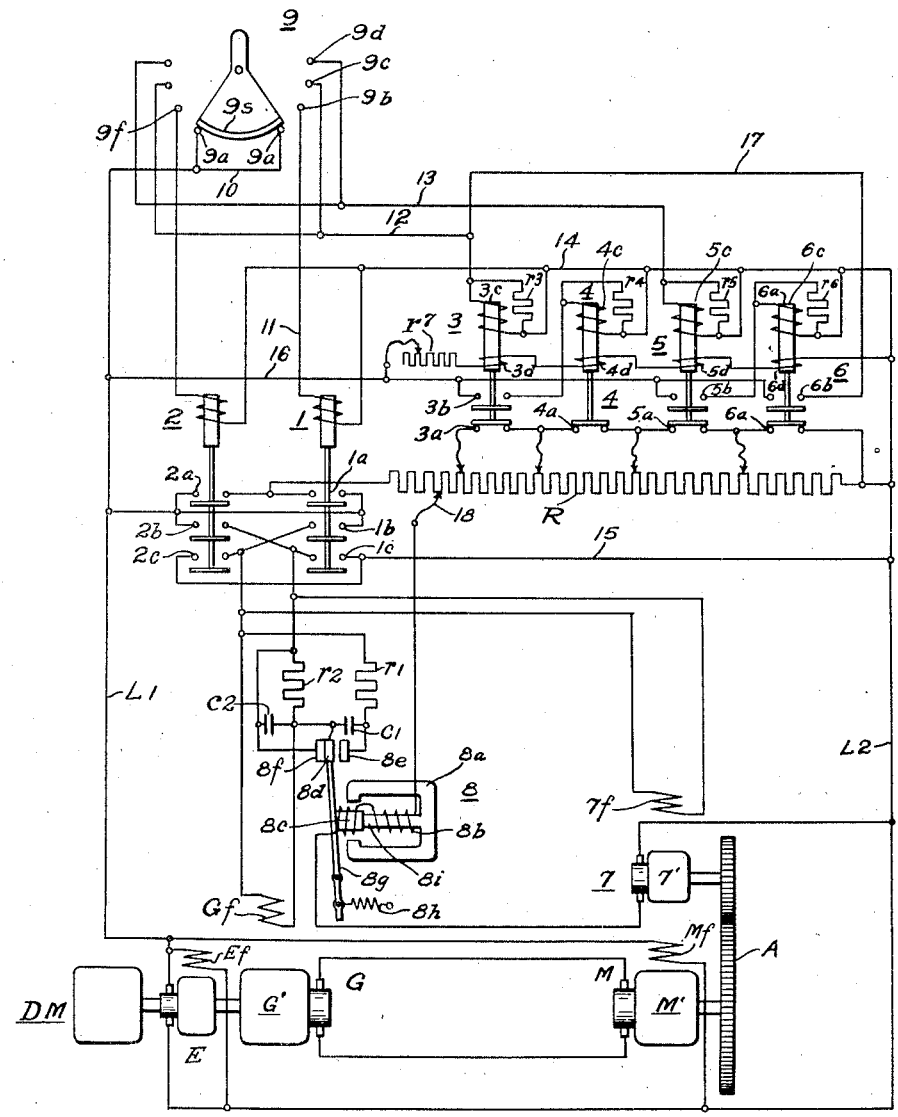
INVENTOR
William F. Eames.
BY
*Wesley L. Carr*
ATTORNEY Patented Apr. 25, 1933

1,905,275

UNITED STATES PATENT OFFICE

WILLIAM F. EAMES, OF EDGEWOOD, PENNSYLVANIA, ASSIGNOR TO WESTINGHOUSE ELECTRIC & MANUFACTURING COMPANY, A CORPORATION OF PENNSYLVANIA

MOTOR CONTROL SYSTEM

Application filed February 15, 1930. Serial No. 428,650.

My invention relates to motor control systems, and has particular relation to motor control systems of the variable voltage type, in which the motor armature is connected in a closed circuit with the armature of a variable voltage generator, the speed of the motor being determined by the generator excitation, and the direction of motor rotation being determined by suitable reversing switches in any desirable circuit of the system, preferably in the generator field circuit.

In such systems, as ordinarily constructed, the motor is accelerated by short circuiting steps of resistance in the generator separately excited field circuit, the time constant of the generator separately excited field circuit being relied upon to determine the rate of increase or decrease of the generator voltage and consequently of the motor speed. While for many purposes such systems are reliable and satisfactory, they are not entirely suitable for applications which require uniform acceleration and close speed regulation, such as elevator systems.

The speed regulation of such a system is inherently poor, due to the resistance drop in the armatures of the generator and motor and in the conductors connecting them and also due to the speed regulation of the generator driving means. If the generator is provided with a cumulative series field winding of sufficient number of turns to compensate for the resistance drop in the common circuit of the motor and generator armatures and for the speed regulation of the generator driving means, the speed of the motor may be held substantially constant regardless of the load. However, the temperature and consequently the resistance of the generator and motor armatures does not remain constant during operation but varies considerably. If the generator series field is designed to maintain the motor speed constant while the machines are cold, the motor speed regulation will assume a drooping characteristic as the machines heat up. If on the other hand the generator series field is designed to maintain the motor speed constant while the machines are at an average working temperature or at a maximum working temperature, the motor speed will rise with increase of load when the machines are cold. A rising speed characteristic is particularly objectionable as motor operation under such conditions is unstable, erratic and difficult to control.

In such a system as that described, in which the time constant of the generator separately excited field circuit is relied upon to determine the rate of acceleration of the motor, adjustment of the motor acceleration characteristics to suit the requirements of a particular installation, cannot always be carried to as fine a degree as desirable. The time constant of the generator separately excited field circuit does not remain the same during the entire acceleration period, but changes with each change of resistance in the field circuit, so that if the average rate of change of generator excitation is at a desirable value during a particular interval in the acceleration period, it will not remain at this desirable value during other intervals when the resistance of the field circuit is of a different value. Furthermore, the time constant of the generator field circuit can only be altered within certain limits determined by the design of the generator and the voltages available for the generator field circuit.

It is accordingly an object of my invention to provide a variable voltage motor control system in which the acceleration and deceleration of the motor are independent of the time constant of the generator field.

Another object of my invention is to provide a variable voltage motor control system in which the period of acceleration and deceleration of the motor may be adjusted over a wide range.

Another object of my invention is to provide a variable voltage motor control system in which means are provided for maintaining the motor speed constant, independent of variations of load, and in which the motor speed regulation is independent of changes in temperature of the generator and motor armatures.

According to my invention I control the speed of the motor in accordance with the difference between the voltages of an auxiliary variable voltage supply and an auxiliary generator driven from the motor shaft, so that the motor speed is held at a value determined by the voltage of the auxiliary source, regardless of variations in the motor load or of variations in temperature of the main generator or motor during operation.

Other objects of my invention will become evident from the following detailed description, taken in conjunction with the accompanying drawing, in which the single figure is a diagrammatic view of a system of control organized in accordance with the present invention.

Referring to the drawing, a direct current motor M, the operation of which is to be controlled, has its armature M' connected in a closed circuit with the armature G' of a direct current main generator G. A pair of supply conductors L1 and L2 are provided for supplying the direct current used in the control system. The supply conductors L1 and L2 are energized from any suitable supply source, such as an exciter E, mounted on the shaft of the main generator G. The main generator G and exciter E are driven at substantially constant speed by any suitable driving means DM. A separately-excited-field winding Gf for the generator G is arranged to be connected to the supply conductors L1 and L2 in series relation with a resistor $r2$ by either of a pair of reversing switches 1 and 2. Each of the reversing switches 1 and 2 carries a set of auxiliary contact members 1a and 2a respectively for connecting a resistor R to supply conductors L1 and L2 when either reversing switch 1 or 2 is closed. A circuit comprising the armature 7' of an auxiliary generator 7 and the moving coil 8c and the stationary coil 8b of a regulator 8 is connected "potentiometer fashion" to an intermediate point 18 of the resistor R. The field winding 7f of the auxiliary generator 7 is connected in parallel relation to the circuit comprising the main generator separately excited field winding Gf and the resistor $r2$, so that its polarity will be reversed when the main generator field is reversed.

The regulator 8 may be of any type, but is preferably of the moving coil type, described in the copending application of Walter Schaelchlin, Serial No. 221,422, filed September 23, 1927, (W. E. Case 12,060), and assigned to the Westinghouse Electric and Manufacturing Company. This regulator comprises a magnetic structure 8a having a core 8i on which is mounted a stationary coil 8b. A pivoted armature 8g of nonmagnetic material carries a movable coil 8c and a movable contact member 8d. The movable coil 8c is arranged in inductive relation to the magnetic structure 8a, as is the stationary coil 8b. The movable contact member 8d is arranged to engage a stationary contact member 8f in one position of the armature, or to engage a second stationary contact member 8e in another position of the armature, the distance between the stationary contact members 8f and 8e being sufficient to permit the movable contact member 8d to assume a neutral position in which neither stationary contact member is engaged. The armature 8g is biased by a spring 8h to the position in which movable contact member 8d engages stationary contact member 8f. The contact members 8d, 8e and 8f are so connected to the external circuit that when contact member 8d engages contact member 8f, the resistor $r2$ in the main generator separately excited field circuit is short-circuited to increase the generator excitation, and when the contact member 8d engages the contact member 8e, the resistor $r1$ is connected in shunt to the main generator field winding Gf to reduce the generator excitation. A condenser $Ci$ is connected between the contact members 8d and 8e to reduce sparking at the regulator contact members, and a similar condenser $C2$ for a similar purpose is connected between the contact members 8d and 8f.

The resistance values of resistors $r1$ and $r2$ is so related to the inductance of the generator field winding Gf and the voltage of supply conductors L1 and L2 that the excitation of the main generator G may be varied rapidly by the regulator 8 at any point in the entire working range.

A plurality of accelerating relays 3, 4, 5 and 6 are arranged to short-circuit adjustable portions of resistor R when they are de-energized and to remove the short circuits when they are energized, the arrangement being such that as the relays 3, 4, 5 and 6 are successively energized, the voltage applied to the circuit including the auxiliary generator armature 7' and the coils of regulator 8 by the potentiometer connection is increased.

Each of the relays 3, 4, 5 and 6 is subject to inductive time delay in closing because of the inductance and resistance of its respective operating winding 3c, 4c, 5c or 6c. A resistor $r3$, $r4$, $r5$ or $r6$ for each relay is connected in parallel to the operating coil 3c, 4c, etc., for introducing an inductive time delay in the opening of the relay. The relays 3, 4, 5 and 6 may also be provided with demagnetizing windings 3d, 4d, 5d and 6d respectively, designed to set up a flux of small value in opposition to the flux of operating coils 3c, 4c, etc., to eliminate the effects of residual magnetism when the operating coils are de-energized and also to permit an adjustment of the time elements of the relays.

The relays 3, 4, 5 and 6 are divided into groups, each group being operated selectively from a contact member of a manual controller 9 to bring the motor up to a predetermined speed. While for simplicity I have shown only two groups of two relays each, one group comprising relays 3 and 4 and the other comprising relays 5 and 6, in practice a larger number of groups and a different number of relays in each group would be used, the total number of relays being determined roughly by desired acceleration period of the motor. I have found, for example, that a particular type of relay operates satisfactorily in the above arrangement with a time element of approximately .2 of a second. Using relays of this type in an installation in which it is desired to accelerate the motor in approximately 2.8 seconds, 14 relays would be used, divided into groups according to the value and number of motor speeds desired.

The first relay of each group (3, 5) is controlled from a contact member of the manual controller 9, each succeeding relay (4, 6) of a group being operated by contact members of the relay (3, 5) in the same group next preceding it in closing sequence, the first relay of each succeeding group except the last being controlled also by contact members of the last relay 6 of the group next following a closing sequence. In the arrangement shown the closing sequence of the accelerating relays is 3, 4, 5, 6 and the opening sequence is 5, 6, 3, 4.

The operation of the above described apparatus may be set forth as follows: Assuming that the main generator G and exciter E are being driven by their common driving means DM and the manual controller 9 is centered; the supply conductors L1 and L2 are energized, the field winding Mf of the main motor M is energized, the reversing switches 1 and 2 and accelerating relays 3, 4, 5 and 6 are all de-energized, the field winding Gf of the main generator and the field winding 7f of the auxiliary generator 7 are disconnected, the resistor R is disconnected, and the motor M and auxiliary generator 7 are at rest.

If the handle of the manual controller 9 is moved in a counter-clockwise direction, contact segment 9s of the controller bridges contact members 9a and 9b, completing a circuit for the operating winding of reversing switch 1. This circuit may be traced from supply conductor L1 through conductor 10, contact members 9a, 9s and 9b of the controller 9, conductor 11, the operating coil of reversing switch 1, conductor 14 to supply conductor L2. Reversing switch 1 closes, connecting resistor R to supply conductors L1 and L2 by closure of its contact members 1a, and completing circuits for the main generator field winding Gf and auxiliary generator field winding 7f by closure of its contact members 1b and 1c. The circuit for the main generator field winding Gf, extends from supply conductor L1 through contact members 1b of reversing switch 1, the generator field winding Gf, contact members 8f and 8d of regulator 8, contact members 1c of reversing switch 1, and conductor 15 to supply conductor L2. The circuit for the auxiliary generator field winding 7f extends from supply conductor L1 through contact members 1b of reversing switch 1, the auxiliary generator field winding 7f, contact members 1c of reversing switch 1 and conductor 15 to supply conductor L2.

The resistor R is now connected directly to the supply conductors L1 and L2, and, because of the potentiometer connection 18, a low voltage is impressed upon the circuit including the coils 8b and 8c of the regulator 8 and the armature of auxiliary generator 7 as the motor M and auxiliary generator 7 are, at this time, at rest, the auxiliary generator 7 generates no voltage, so that the low voltage mentioned above acts unopposed upon the regulator 8 to maintain the contact member 8d in engagement with the contact member 8f. The resistor r2 is, accordingly, maintained short circuited, to cause the full voltage of exciter E to be impressed on the generator field winding Gf.

The excitation of the generator G now increases rapidly, motor M starts and increases in speed, while the auxiliary generator 7 develops an increasing voltage in opposition to the low voltage impressed upon the regulator 8 by the resistor R, until the voltage of auxiliary generator 7 exceeds the voltage between the connection 18 to the resistor R and the supply conductor L2 by an amount sufficient for the force on the moving coil 8c of the regulator 8 to overcome the tension of spring 8h. When this occurs the movable contact member 8d of regulator 8 disengages the stationary contact member 8f, inserting the resistor r2 in series with the main generator field winding Gf. The excitation of generator G is now reduced, and the speed of main motor M decreases slightly, permitting movable contact member 8d of the regulator 8 to reengage the stationary contact member 8f. The movable contact 8d of the regulator 8 thus vibrates, maintaining the speed of motor M substantially constant at a low speed value proportional to the sum of the voltage between the connection 18 to the resistor R and the supply conductor L2, and the voltage necessary to overcome the tension of spring 8h of the regulator 8. If the load is overhauling, the generator G first supplies power to the motor M until the motor M and its load are accelerated to low speed value, after which the direction of power is reversed and the motor M returns power to the generator G, the movable contact member 8d of the regulator vibrating against stationary contact member 8e to maintain the motor speed constant at the low speed value. If the load on the motor M or the resistance of the common circuit of the generator and motor armature changes, the regulator 8 acts to change the excitation of generator G accordingly to maintain the motor speed constant.

If the handle of manual controller 9 is moved farther in a counter-clockwise direction, contact segment 9s of controller 9 bridges contact members 9a and 9c completing a circuit for the operating coil 3c of accelerating relay 3. This circuit may be traced from supply conductor L1 through conductor 10, contact members 9a, 9s and 9c of controller 9, conductor 12, the operating coil 3c of accelerating relay 3 and conductor 14 to supply conductor L2. The current through the operating coil 3c now gradually builds up at a rate determined by the inductance and resistance of the relay coil. At the expiration of a predetermined time interval relay 3 closes, removing a short circuit for a portion of resistor R by the opening of its contact members 3a and establishing a closing circuit for relay 4 by closure of its contact members 3b. This circuit may be traced from supply conductor L1 through conductor 16, contact members 3b of accelerating relay 3, the operating coil 4c of accelerating relay 4, thence through conductor 14 to supply conductor L2. The current through the relay coil 4c now gradually builds up, and at the expiration of a predetermined time interval the relay 4 operates, removing a short circuit from a second section of resistor R by the opening of its contact members 4a. The voltage between the connection 18 to the resistor R and the supply conductor L2 thus increases in increments at predetermined time intervals.

Each increment of voltage acts momentarily unopposed upon the regulator 8 to cause engagement of the contact members 8d and 8f and the consequent short-circuiting of resistor r2. The voltage of generator G and the speed of motor M accordingly rise until the increasing voltage of auxiliary generator 7 equals the voltage impressed upon the regulator 8 by the resistor R. When the motor has fully accelerated in response to closure of relays 3 and 4, it operates at a constant intermediate speed.

If the handle of controller 9 is moved to the next operating point, a circuit is completed for the accelerating relay 5. This circuit extends from supply conductor L1, through conductor 10, contact members 9a, 9s and 9d of the manual controller 9, conductor 13, the operating coil 5c of accelerating relay 5 and conductor 14 to supply conductor L2. After the expiration of a predetermined time interval relay 5 closes, removing a short circuit from a third section of resistor R by the opening of its contact members 5a, and closing a circuit for the operating coil 6c of relay 6 by the closure of the contact members 5b. This circuit may be traced from supply conductor L1, through conductor 16, contact members 5b, the operating coil 6c of accelerating relay 6 and conductor 14 to supply conductor L2. After the expiration of a predetermined time interval accelerating relay 6 closes, removing a short circuit from a third section of resistor R by the opening of its contact members 6a and establishing a holding circuit for relay 3 independent of the manual controller 9 by the closure of its contact members 6b. This circuit may be traced from supply conductor L1, through conductor 16, contact members 6b of relay 6, conductor 17, the operating coil 3c of relay 3 and conductor 14 to supply conductor L2.

The removal of the short-circuits around sections of resistor R by the successive operation of accelerating relays 5 and 6 brings the speed of motor M up to full speed value. The motor M now operates at full speed, its speed being held constant regardless of variations of load or of the temperature of the generator and motor armatures by the action of regulator 8.

If the handle of the manual controller 9 is now returned toward central position, the circuit of the operating coil 5c of relay 5 is broken at contact member 9d of the manual controller. The relay 5 does not immediately drop out, however, as the inductance of the relay coil maintains a momentary current through the resistor r5. After the expiration of a predetermined time interval relay 5 drops out, short-circuiting a section of resistor R and opening the circuit of the operating coil of relay 6. After the expiration of a predetermined time interval relay 6 drops out, short-circuiting a section of resistor R and opening the holding circuit for relay 3 at contact members 6b, thereby preparing the circuit of relay 3 for control by the controller 9. The speed of motor M has now decreased to intermediate speed value.

If the handle of manual controller 9 is now returned further toward central position, the circuit of the operating coil 3c of relay 3 is broken at contact member 9c. After the expiration of a predetermined time interval, relay 3 drops out short-circuiting a section of resistor R and breaking the circuit of the operating coil 4c of relay 4. After a predetermined time interval relay 4 drops out short-circuiting a section of resistor R. The motor M now operates at low speed.

If the manual controller 9 is now centered, the circuit of the operating coil of reversing switch 1 is broken at contact member 9b, the motor being brought to rest and the circuits restored to their original condition.

By adjusting the potentiometer connection 18 of the resistor R, the full speed value of the motor M may be varied. By adjusting the proportion of resistor R controlled by the relays 3, 4, 5 and 6, the intermediate and low speed values may be adjusted. By adjusting the resistor r7, the fluxes due to the de-magnetizing coils 3d, 4d, 5d and 6d may be simultaneously adjusted. This provides a blanket adjustment for the time elements of the separate relays, as each relay closes when the flux due to its operating coil exceeds the flux due to the de-magnetization coil by a predetermined amount, and drops out under similar conditions.

While I prefer to use a regulator of a specified type operating upon the generator separately excited field, because of the advantages of this arrangement, it will be understood that my invention is not limited specifically to this arrangement. I may for example omit the spring 8h of the regulator 8, in which case the regulator 8 would operate to maintain the difference between the voltages of the generator 7 and the potentiometer voltage (between 18 and L2) at a different predetermined value from the value maintained in the arrangement shown. If the spring 8h is omitted, the predetermined value would be zero. Alternatively I may use an entirely different type of regulator or may omit the regulator entirely. In the latter case a component of the excitation of the main generator would be controlled directly in accordance with the difference between the voltages of generator 7 and the potentiometer voltage. While I prefer to introduce the control in the generator field circut, because of the advantages of this arrangement, I may introduce the control in other circuits of the system consistent with the desired result of maintaining the speed of the main motor proportional to the potentiometer voltage.

In my copending application Serial No. 428,647, filed February 15, 1930, I have disclosed a motor-control system of the variable voltage type, in which the excitation of the generator supplying the work motor is controlled by a regulator responsive to the differences of voltages of an auxiliary generator driven at variable speed and a second auxiliary generator driven by the work motor, in such manner as to eliminate the effect of load upon the speed of the work motor.

In my copending application Serial No. 428,648, filed February 15, 1930, I have disclosed a variable voltage motor-control system, in which the excitation of the generator supplying the work motor is controlled by means of a differential device responsive to differential rotation of the work motor and an auxiliary motor, in such a manner as to eliminate the effect of load on the speed of the work motor, and in which the speed and rate of change of speed of the auxiliary motor may be independently controlled.

In my copending application Serial No. 445,303, filed April 18, 1930, I have disclosed a variable voltage motor-control system, in which the excitation of the generator supplying the work motor is controlled in accordance with the difference between the counter-electromotive force of the work motor and the voltage of an auxiliary generator driven at constant speed, in such a manner as to eliminate the effect of load upon the speed of the work motor.

In my copending application Serial No. 445,304, filed April 18, 1930, I have disclosed a variable voltage motor-control system, in which the excitation of the generator supplying the work motor is controlled in accordance with the counter-electromotive force of the work motor, as measured by the terminal voltage of the generator corrected for armature resistance drop, in such a manner as to eliminate the effect of load upon the speed of the work motor.

In my copending application Serial No. 471,684, filed July 30, 1930, I have disclosed an elevator system, in which the speed regulation of the elevator motor is corrected by means of a compounding arrangement and the rate of deceleration of the elevator motor is controlled by the time element means, and in which a load responsive device is provided for operating upon the time element means to obtain uniform deceleration under all load conditions.

In my copending application Serial No. 547,389, filed June 27, 1931, have disclosed a variable voltage motor-control system, in which the excitation of the generator supplying the work motor is controlled in accordance with the difference between the counter-electromotive force of the work motor and the voltage of an auxiliary generator driven at variable speed, in such a manner as to eliminate the effect of load upon the speed of the work motor.

In the present application, I do not claim the control of the generator excitation broadly in accordance with a voltage proportional to the difference between the actual speed of the motor and a predetermined control speed, as this is the subject matter of my application Serial No. 428,647, filed February 15, 1930, mentioned above.

In the present application, I do not claim the control of the generator excitation in accordance with the differential rotation of the work motor, as compared with an independently driven rotary element, as this subject matter is claimed in my copending application Serial No. 428,648, filed February 15, 1930, mentioned above.

In the present application, I do not claim the control of the generator excitation by means responsive to a control voltage, the terminal voltage of the motor, and a voltage proportional to the motor armature current, nor by means responsive to a control voltage and a voltage substantially equal to the counter-electromotive force of the work motor, as this subject matter is covered in my copending application Serial No. 445,303, filed April 18, 1930, mentioned above.

I do not claim the control of the generator excitation broadly by means responsive to the terminal voltage of the motor and a voltage proportional to the motor armature current, nor broadly by means responsive to a voltage substantially equal to the motor counter-electromotive force, as this subject matter is claimed in my copending application Serial No. 445,304, filed April 18, 1930, mentioned above.

In the present application, I do not claim the control of the rate of change of speed of an elevator motor by means including a load responsive element for correcting the motor speed regulation, means for determining the rate of change of speed of the elevator motor, and additional load responsive means for operating upon the last mentioned means to cause the rate of change of speed of the elevator motor to be the same under all load conditions, as this subject matter is claimed in my copending application Serial No. 471,684, filed July 30, 1930, mentioned above.

I do not claim the control of the generator excitation by means responsive to the counter-electromotive force of the motor and a voltage furnished by the specific means of a control generator driven at variable speed, nor to the control of the generator excitation by means involving an auxiliary machine decelerated by the specific means of an electro-magnetic brake, as this subject matter is claimed in my copending application Serial No. 547,389, mentioned above.

I do not, therefore, wish to be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In a motor control system, a motor, a generator, means for driving said generator, electrical connections between the armatures of said motor and said generator means for impressing a voltage upon a field winding of said generator, means for regulating said voltage to cause the speed of said motor to be independent of load and for temporarily increasing said voltage above its final value while the motor is accelerating to a corresponding speed, and means for controlling said last mentioned means to cause the speed of said motor to have successively higher values at the expiration of successive intervals of time.

2. In a motor control system, a motor, a generator, means for driving said generator, electrical connections between the armatures of said motor and said generator, a field forcing resistor in the circuit of a field winding of said generator, a circuit connected in shunt to said resistor, contact members in said last mentioned circuit, means for closing said contact members while said motor is accelerating to a desired speed and for opening said contact members when the motor attains said desired speed, and means for controlling said last mentioned means to cause said desired speed to have successively higher values at the expiration of successive intervals of time.

3. In a motor control system, a motor, a generator, means for driving said generator, electrical connections between the armatures of said motor and said generator, means for impressing a voltage upon the field winding of said generator, means including a plurality of time element relays for changing the value of said voltage in increments at predetermined time intervals and means for simultaneously adjusting the time elements of said relays.

4. In a motor control system, a motor, a generator, means for driving said generator, electrical connections between the armatures of said motor and said generator, an auxiliary voltage supply, means for causing the voltage of said auxiliary supply to have successively higher values at the expiration of successive intervals of time, means for producing a voltage proportional to the speed of said motor, and means responsive to the algebraic sum of the voltage of said auxiliary supply and said last mentioned means for controlling the excitation of said generator to maintain said sum at a predetermined value.

5. In a motor control system, a motor, a main generator, means for driving said main generator, electrical connections between the armatures of said motor and said main generator, an auxiliary voltage source, a resistor connected to said source, a plurality of time controlled relays for short-circuiting portions of said resistor, a potentiometer connection to said resistor, an auxiliary generator, means for driving said auxiliary generator at a speed proportional to the speed of said motor and means responsive to the algebraic sum of the voltages of said potentiometer connection and said auxiliary generator for controlling the excitation of said main generator to maintain said sum at a predetermined value.

6. In a motor control system, a motor, a main generator, means for driving said main generator, electrical connections between the armatures of said motor and said main generator, an auxiliary voltage source, a resistor connected to said source, a plurality of time element relays for short-circuiting portions of said resistor, said relays being divided into groups, a controller for operating a first relay of each group, means for operating the remaining relays of each group selectively after operation of said first relay, a potentiometer connection to said resistor, an auxiliary generator, means for driving said auxiliary generator at a speed proportional to the speed of said motor, and means responsive to the algebraic sum of the voltages of said potentiometer connection and said generator for maintaining said sum at a predetermined value.

7. In a motor-control system, a motor, a generator, means for driving said generator, electrical connections between the armatures of said motor and said generator, a field-forcing resistor in the circuit of a field winding of said generator, a circuit connected in shunt to said resistor, contact members in said last mentioned circuit, an auxiliary voltage supply, means for producing a voltage proportional to the speed of said motor and means, responsive to the algebraic sum of the voltages of said auxiliary supply and said last mentioned means, for maintaining said contact members closed while said motor is accelerating to a predetermined speed and for opening said contact members when said motor attains said predetermined speed.

8. In a motor-control system, a motor, a generator, means for driving said generator, electrical connections between the armatures of said motor and said generator, a circuit in shunt to a field winding of said generator, contact members in said circuit, an auxiliary voltage supply, means for producing a voltage proportional to the speed of said motor and means, responsive to the algebraic sum of the voltages of said supply and said last mentioned means, for maintaining said contact members closed while said motor is decelerating to a predetermined speed and for opening said contact members when said motor attains said predetermined speed.

9. In a motor-control system, a motor, a generator, means for driving said generator, electrical connections between the armatures of said motor and said generator, a field-forcing resistor in the circuit of a field winding of said generator, a circuit in shunt to said resistor, contact members in said last mentioned circuit, an auxiliary voltage supply, means for producing a voltage proportional to the speed of said motor and means, responsive to the difference of the voltages of said auxiliary supply and said last mentioned means, for maintaining said contact members closed while said motor is accelerating to a predetermined speed and for opening said contact members when said motor attains said predetermined speed.

10. In a motor-control system, a motor, a generator, means for driving said generator, electrical connections between the armatures of said motor and said generator, a circuit in shunt to a field winding of said generator, contact members in said circuit, an auxiliary voltage supply, means for producing a voltage proportional to the speed of said motor and means, respective to the difference of the voltages of said supply and said last mentioned means, for maintaining said contact members closed while said motor is decelerating to a predetermined speed and for opening said contact members when said motor attains said predetermined speed.

11. In a motor control system, a motor, a generator, means for driving said generator, electrical connections between the armatures of said motor and said generator, a resistor in series with the field winding of said generator, a circuit in shunt to the field winding of said generator, contact members in said circuit, means for operating said contact members, and means responsive to the speed of said motor for controlling said last mentioned means to operate said contact members to complete said circuit when the actual speed of said motor exceeds a predetermined value and to operate said contact members to break said circuit when the actual speed of said motor is below said predetermined value.

12. In a motor-control system, a motor, a generator, means for driving said generator, electrical connections between the armatures of said motor and said generator, means for impressing a voltage upon a field winding of said generator, field forcing means for maintaining said voltage below the value corresponding to a desired speed of said motor while said motor is decelerating to said desired speed, means for rendering said field forcing means ineffective when said motor attains said desired speed and for causing the speed of said motor to be independent of load, and means for controlling said last mentioned means to cause the speed of said motor to have successively lower values at the expiration of successive intervals of time.

In testimony whereof, I have hereunto subscribed my name this 12th day of February, 1930.

WILLIAM F. EAMES.